United States Patent Office 3,450,644
Patented June 17, 1969

3,450,644
TREATMENT OF OXIDATIVELY REGENERATED MOLECULAR SIEVE CATALYSTS
Mohammed Ali Lanewala, Buffalo, Anthony P. Bolton, Niagara Falls, and Paul E. Pickert, North Tonawanda, N.Y., assignors to Union Carbide Corporation, a corporation of New York
No Drawing. Filed Nov. 15, 1966, Ser. No. 594,368
Int. Cl. B01j 11/70
U.S. Cl. 252—416    7 Claims

ABSTRACT OF THE DISCLOSURE

Molecular sieve catalysts which have become coked by contact with hydrocarbons are regenerated by oxidizing the coke at 800° F., cooling the zeolite to below 600° F., partially rehydrating the zeolite to contain 4–18 percent water and then reheating the zeolite to at least 850° F. in a nonoxidizing atmosphere.

---

This invention relates to the regeneration of coked crystalline zeolitic molecular sieve catalysts and their use in organic reactions as for example promoting desired hydrocarbon conversions. More specifically, the invention relates to a method for improving the recovery of catalytic activity in an oxidatively regenerated zeolitic molecular sieve catalyst for organic reactions generally considered as proceeding through carbonium or ionic type intermediates, especially isomerization.

Hydrocarbon conversion and the isomerization of hydrocarbons in particular is of special importance to the petroleum industry. In recent years, with the advent of high horsepower gasoline-driven internal combustion motors, a need has arisen for higher octane number gasolines. Natural straight-run gasolines, i.e., naphthas, contain chiefly normal paraffins such as normal pentane and normal hexane, which have relatively low octane numbers, i.e., too low for modern high power requirements. It has become essential, therefore, to convert these low octane components to their higher octane counterparts. The isomerization of these hydrocarbon components accomplish this conversion, i.e., the isomers resulting have a much higher octane rating. Hence, the facility with which this isomerization is accomplished has become of prime importance.

Formerly, straight-run naphtha of low octane quality was used directly as motor gasoline. However, with the above-described need for higher-octane gasoline arising, attempts were made at thermally rearranging or reforming the naphtha molecules for octane number improvement. "Reforming" is the term employed by the petroleum industry to refer to the treatment of gasoline fractions having a boiling range above about 90° C. to obtain higher octane ratings and improved "antiknock" characteristics through the formation of aromatic as well as branched chain hydrocarbons. The thermal reforming of gasoline proved to be inadequate and catalytic reforming in a hydrogen-rich atmosphere, in large part, was substituted therefor by the gasoline industry.

In this regard, also, to permit full use to be made of tetraethyl lead (which is less effective with aromatics than with paraffins), high octane paraffins must be incorporated in gasoline blends. Such high octane paraffins can only be obtained from alkylation (which may require butane isomerization) or from the isomerization of pentanes, hexanes, or other light straight-chain hydrocarbons.

Among the isomerization processes known in the art, the most recent have dealt with converting normal paraffins, such as pentane and n-hexane, to their branch-chain counterparts by contacting, in the presence of hydrogen, the straight-chain hydrocarbons at an elevated temperature and pressure with a reforming type solid catalyst. U.S. Patent No. 2,831,908 and British Patent No. 788,588 relate to such processes. In each of the processes disclosed in these patents, however, a corrosive activator, such as a halide, is employed in the catalyst. Moreover, neither of these processes can be used for isomerizing a mixture of n-pentane and n-hexane with a high degree of efficiency.

The catalysts employed for the reforming of gasoline fractions boiling above 90° C., to higher octane products also employ acidic halide activators of objectionably corrosive nature.

It is known in the art to improve the quality of hydrocarbons, particularly petroleum hydrocarbons, by contacting them at various operating conditions with catalysts to effect the abovementioned hydrocarbon conversions. Heretofore, only strong mineral and Lewis-type acids have been found to be effective as catalysts for alkylation activity. Many difficulties have been encountered because of the corrosive nature of these strong acid catalysts thereby limiting the operating conditions of the conversion process.

It is also known that crystalline zeolitic molecular sieves as for example the large pored zeolites X and Y may be used to promote the carbonium type reaction, and may contain a catalytically active metal such as the platinum-palladium group as a hydrogenation-dehydrogenation component. The resulting dual-function catalyst has been quite successful for effecting isomerization of straight-chain hydrocarbons, especially when the molecular sieve component is at least partially decationized.

On continued contact with the hydrocarbon feedstock, carbonaceous matter, i.e., coke, which is nonvolatile at the operating condition, is deposited on the surface and within the pores of the molecular sieve. The deposition of coke eventually reduces the sieve's catalytic activity and the molecular sieve must be periodically regenerated by removal of the coke deposits. The most effective method for effecting this removal is by oxidative burnoff under controlled conditions of oxygen concentration, temperature and water vapor concentration. As described in U.S. Patent Nos. 3,069,362 and 3,069,363 to R. L. Mays et al., the oxygen concentration during the initial portion of the burnoff is preferably below about 1% and the temperature of the molecular sieve below about 1150° F. to maintain the water vapor partial pressure below about 4 p.s.i.a. After the coke loading has been reduced to below about 1.2 wt. percent, the oxygen concentration of the regenerating gas may be increased above 1% without encountering excessive temperatures in the molecular sieve bed.

Although the aforedescribed oxygen regenerative method permits substantially complete recovery of catalytic activity of single-function molecular sieve catalysts (which do not contain catalytically active metal), the method is not effective with the dual-function molecular sieve based catalysts.

An object of this invention is to provide an improved method for regenerating a coked dual-function molecular sieve-based catalyst.

Another object is to provide such a method that affords an oxidatively regenerated catalyst having about the same catalytic activity as fresh catalyst before contact with the feedstock.

Still another object is to provide an improved hydrocarbon conversion reaction with the carbonium-type intermediate.

A further object of this invention is to provide an improved process for isomerization of straight chain hydrocarbons.

Other objects and advantages of the present invention will be apparent from the ensuing description and appended claims.

One embodiment of the invention relates to an improvement in the oxidative regeneration of a coked crystalline zeolite catalyst composition containing catalytically active metal. In this embodiment, the decoked catalyst from the oxidative burnoff is provided at temperature of at least 800° F., cooled to below 600° F. and partially rehydrated and equilibrated. The partial rehydration is sufficient to increase the weight percent water in the zeolite from about 2.5% (on completion of coke burnoff) to between 4 and 18%. In the fully hydrated state, crystalline zeolites contain 20–25 weight percent water, depending on the particular species and its cation composition. As used herein, the weight percent water in a crystalline zeolite is that measured as weight percent loss on ignition (LOI) measured at 930° F. and in normal air. The cooled, partially rehydrated and equilibrated catalyst is then reactivated by heating to temperature of at least 850° F. in a nonoxidizing atmosphere, preferably hydrogen. In this manner, the catalytically active metal, which was oxidized to a less active state during the oxidative regeneration, is reduced to a lower valence or elemental metal state.

It has been unexpectedly discovered that the invention substantially completely restores the catalytic activity of a crystalline zeolite based-active metal containing composition regenerated by oxidative removal of coke. The reasons for this remarkable phenomenon are not fully understood, but the following explanation is offered although we do not intend to be limited thereby. Oxidative burnoff of coke from crystalline zeolites may leave carbon monoxide or other poisons in the zeolite which are chemisorbed by the active metal component of the catalyst. These poisons are not completely removed during the normal reactivation of the catalyst in which the latter is heated in a hydrogen atmosphere. The decoked reactivated catalyst composition still contains the poison when contacted with additional organic feedstock and the hydrogenation component of the dual-function catalyst is relatively ineffective. As a result, this catalyst does not provide the conversion activity afforded by fresh catalyst prior to coking. Our invention avoids this poisoning because the water introduced by partial rehydration is more strongly adsorbed by the crystalline zeolite than the carbon monoxide or other poison, and displaces it. However, the adsorbed water is desorbed unlike the poison during the hydrogen reactivation step and the metal hydrogenation component regains its full activity.

The catalytically active metal, especially metals of Group VIII such as platinum or palladium, is preferably provided in finely-dispersed catalytic amounts, that is, 0.05 to 2.0 weight percent of the crystalline zeolite in the finished catalyst. For best results, amounts of 0.2–0.6 weight percent of the Group VIII noble metals are employed. It should be noted, however, that the presence of the metal in amounts higher than 2.0 percent will also enhance the conversion of hydrocarbons. However, it has been found that the use of more than 2.0 percent of the metals such as the noble metals does not substantially enhance catalytic activity and hence is superfluous as well as exorbitantly expensive. The catalytically active metals may be dispersed upon the crystalline zeolite in their elemental state or as oxides or compounds having catalytic properties. Among the metals and their oxides which have hydrocarbon conversion activity are copper, silver, gold, zinc, cadmium, titanium, tin, lead, vanadium, antimony, bismuth, chromium, molybdenum, tungsten, manganese, rhenium, iron, cobalt, nickel and the noble metals of the palladium and platinum groups.

It has been discovered that, although the compositions prepared by the present invention exhibit catalytic activity for all hydrocarbon conversion processes, they show unexpectedly improved results in certain specific conversion processes characterized as proceeding through the carbonium or ionic type mechanism as distinguished from the radical-type mechanism. Included in such processes are: isomerization, reforming, hydrocracking, alkylation and dealkylation. The preferred metals are palladium and platinum, particularly palladium because of its lower cost and comparable activity.

The catalytically active metals may be introduced to the crystalline zeolite by any method which will result in the attainment of a highly dispersed catalytically active metal. Among the methods which may be employed are (1) impregnation using an aqueous solution of a suitable metal compound followed by drying and thermal or chemical decomposition of the metal compound; (2) adsorption of a fluid decomposable compound of the metal compound; (3) cation exchange using an aqueous solution of a suitable metal salt followed by chemical reduction of the cations; (4) cation exchange using an aqueous solution of a suitable metal compound in which the metal is in the cationic state with coordination complexing agents followed by thermal or chemical decomposition of the cationic complex. Methods (1), (2) and (3) are conveniently employed to introduce metals such as copper, silver, gold, cadmium, iron, cobalt and nickel while methods ), (2) and (4) are suitable for introducing the platinum and palladium group metals. Method (2) is suitable for introducing metals such as titanium, chromium, molybdenum, tungsten, rhenium, manganese, zinc and vanadium. The metal loading techniques of methods (2), (3) and (4) are preferred as the resulting products exhibit higher catalytic activity than those produced by method (1). The ion exchange techniques of methods (3) and (4) are particularly advantageous since their products have exhibited the highest catalytic activities. Methods (2), (3) and (4) are preferred because of the deposition of the active metal throughout the inner adsorption area of the crystalline zeolite, the most active dispersion being achieved by methods (3) and (4).

The impregnation method (1) may be practiced in any way that will not destroy the essential structure of the crystalline zeolite. Impregnation differs from the other loading methods in that the metal is commonly in the anionic part of a water soluble compound and thus is only deposited on the external surfaces of the zeolite. In preparing the catalyst, a water soluble compound of the metal, such as a Group VIII metal, in an amount sufficient to contain the quantity of metal desired in the finally prepared catalyst product is dissolved in water and mixed with the crystalline zeolite. The zeolite is then dried and heated to a temperature sufficient to thoroughly remove the water, leaving the metal compound in a uniform deposit. Further heating may in some instances be required to convert the metal to its active state, such as heating in hydrogen or other reducing atmospheres.

Method (2) provides a means for depositing the active metals in the inner adsorption region of the crystalline zeolite. The zeolite is first activated to remove any adsorbed water and then contacted with a fluid decomposable compound of the metal thereby adsorbing the compound into the sieve. Typical of such compounds are the metal carbonyls, metal alkyls, volatile metal halides and the like. The internally adsorbed compound is then reduced thermally or chemically to its elemental metal thus leaving an active metal uniformly dispersed throughout the internal adsorption region of the zeolite.

The ion-exchange methods (3) and (4) differ since (3) relates to the use of metal salts such as the chlorides and and nitrates of the iron group metals, wherein the metal itself is the cation, whereas (4) relates to the use of compounds of metals, such as the platinum and palladium group metals, in which the metal is contained in the cationic portion of the compound in coordination complex form.

The ion-exchange method (4) may be practiced in standard fashion, i.e., the metal compound is dissolved in an excess of water in an amount calculated to obtain the desired amount of metal in the catalyst product. This solution is preferably then added to the zeolite with stirring and after a sufficient time has elapsed to allow the ion-exchange to take place, the exchange zeolite is separated by filtration. The ion-exchange of the active metal containing cations into the zeolite is substantially quantitative and the completeness of the exchange process can be detected by chemical tests for the metal in a sample of liquid from the exchanging solution. The filtered zeolite may then be washed to the extent necessary to remove any residual occluded salts followed by drying to produce a pelletizable powder. Decomposition of the active metal containing cation is effected by heating to above 300° C. and preferably above 400° C. When the metal employed is of the iron group, it is preferred to conduct this operation in a reducing atmosphere such as provided by hydrogen, methane or carbon monoxide while in the case of the noble metals air may be employed. This is preferably done after the powder has been pelletized, since if it is done beforehand, it becomes necessary to perform the pelletizing operation in a dry atmosphere to avoid rehydration beyond the extent that is preferred as discussed hereinafter.

The better catalytic activity shown by the metals introduced in the crystalline zeolite by ion-exchange rather than impregnation is believed due to the greater dispersion of the metal within the inner adsorption region of the crystalline zeolite achieveable with ion-exchange techniques. It is believed that the metal introduced by ion-exchange techniques is dispersed throughout the crystalline zeolite in essentially atomic dispersion.

The term "zeolite," in general, refers to a group of naturally occurring hydrated metal aluminosilicates, many of which are crystalline in structure. However, a number of synthetic crystalline zeolites have been prepared. They are distinguished from each other and from the naturally occurring material, on the basis of their composition, their crystal structure and their adsorption properties. A suitable method for describing the crystal structure, for example, is by their X-ray powder diffraction patterns.

Crystalline zeolites structuraly consist basically of an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, e.g., alkali metal or alkaline earth metal cations. This balance may be expressed by the formula $2Al/(2Na, 2K, 2Li, Ca, Ba, Sr, etc.)=1\pm0.15$. Moreover, it has been found that one cation may be replaced by another by suitable exchange techniques. Consequently, crystalline zeolites are often employed as ion-exchange agents. The cations are located in the vicinity of the $AlO_4$ tetrahedra, but their exact location depends on the valency and the size of the cations.

Any crystalline zeolite may be employed in the present invention including the naturally occuring chabazite, faujasite, erionite, mordenite and gmelinite as well as the synthetic types A, X, Y and L. The crystalline zeolites having pores sufficiently large to adsorb benzene are preferred for catalyzing hydrocarbon conversions.

Zeolite A has an apparent pore size of 4–5 angstroms depending on the structural cations, and may be represented by the formula:

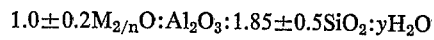

wherein M represents a metal, $n$ is the valence of M, and $y$ may have any value up to about 6. The as synthesized zeolite A contains primarily sodium ions and is designated sodium zeolite A or zeolite 4A. Zeolite A is described in more detail in U.S. Patent No. 2,882,243.

Among the large-pored crystalline zeolites which have been found to be useful in the practice of the present invention, zeolite X, zeolite Y, zeolite L and faujasite are the most important and have apparent pore sizes on the order of 9–10 Angstroms.

The chemical formula for zeolite Y expressed in terms of mole oxides may be written as:

wherein $x$ is a value greater than 3 up to about 6 and $y$ may be a value up to about 9. Zeolite Y has a characteristic X-ray powder diffraction pattern which may be employed with the above formula for identification. Zeolite Y is described in more detail in U.S. Patent No. 3,130,007.

Zeolite X is a synthetic crystalline zeolitic molecular sieve which may be represented by the formula:

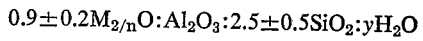

wherein M represents a metal, particularly alkali and alkaline earth metals, $n$ is the valence of M, and $y$ may have any vaue up to about 8 depending on the identity of M and the degree of hydration of the crystalline zeolite. Zeolite X, its X-ray diffraction pattern, its properties, and method for its preparation are described in detail in U.S. No. 2,882,244.

The compostion of zeolite L, expressed in terms of mol ratios of oxides, may be represented as follows:

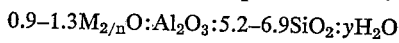

wherein M designates a cation, $n$ represents the valence of M, and $y$ may be any value from 0 to about 9. Zeolite L, its X-ray diffraction pattern, its properties, and method for its preparation are described in detail in U.S. Patent No. 3,216,789.

Crystalline zeolites often contain alkali metal cations in their structural framework, and in most instances, the composition becomes a superior catalyst for organic reactions if at least part of the alkali metal is replaced by polyvalent metal cations as for example the alkaline earth group or the rare earth group. This replacement may be effected in many instances by the conventional ion exchange technique using an aqueous medium. The preparation and superior performance of polyvalent cation exchanged crystalline zeolites as catalysts is described in considerable detail in U.S. Patent No. 3,236,762.

Another method for improving the catalytic performance of crystalline zeolites having alkali metal cations is by removing at least a portion of these cations so that the composition becomes decationized. This may be accomplished by ion-exchanging the alkali metal cations of the crystalline zeolite with ammonium ions or other easily decomposable cations such as methyl or other substituted quaternary ammonium ions, and then heating the ammonium exchanged zeolite to temperatures of about 350–600° C. (662–1112° F.). Alternatively, the alkali metal cations may be replaced by hydrogen cations followed by the heating step. As used herein, the term "decationized" refers to that unique condition whereby a substantial amount, i.e., at least 10% of the aluminum atoms of the aluminosilicate structure are not associated with any cations. Another way of expressing decationization is that condition whereby less than 90% of the aluminum atoms of the aluminosilicate structure are associated with cations. The preparation and superior performance of decationized crystalline zeolites as catalysts is described in considerable detail in U.S. Patent No. 3,236,761.

In one preferred embodiment of the invention, the catalyst composition is decationized zeolite Y having less than 60% of its structural aluminum atoms associated with cations, and contains catalytically active metal in its inner adsorption region. In another preferred embodiment, the catalyst composition is partially decationized zeolite Y having at least 10% of its aluminum structural atoms associated with polyvalent cations.

Although the invention is specifically directed to improving the catalytic activity of an oxidatively decoked dual-function catalyst based on a crystalline zeolite containing a catalytically active metal, it should be understood that these two materials may constitute only a minor part of the finished catalyst composition on a weight basis. For example, the crystalline zeolite containing catalytically active metal may be distributed throughout an inorganic oxide matrix, for example silica as described in U.S. Patent No. 3,140,249 or alumina gel as described in U.S. Patent No. 2,865,867. In a like manner, the crystalline zeolite may be incorporated with an aluminiferous oxide. Such gels are well known in the art and may be prepared, for example, by adding ammonium hydroxide, or ammonium carbonate to a salt of a nitrate in an amount sufficient to form aluminum hydroxide which upon drying is converted to alumina. The crystalline zeolite may be incorporated with the aluminiferous oxide while the latter is in the form of hydrosol, hydrogel or wet gelatinous precipitate.

Crystalline zeolite-catalytically active metal compositions may also be prepared in situ from a preformed body mixture of reactive clay, silica, and a limited amount of water. The preformed body is heated under a controlled temperature program such that the reactants are at least partially converted to a crystalline zeolite. Such compositions containing catalytically active metal are useful in practicing this invention.

To achieve this improved catalyst, it is essential that the water introduced during the partial rehydration step be substantially uniformly distributed through the mass of the dual-function catalyst. That is, the mass must be equilibrated with respect to the water. This may be accomplished either as an integral portion of the partial rehydration step or as a separate succeeding step. For example, if the decoked catalyst mass is thereafter cooled to ambient temperature, equilibration may be achieved by moderate heating to perhaps 80° C. during the partial rehydration to accelerate the movement and diffusion of water through the zeolite mass. Alternatively, the partial rehydration may be performed at ambient temperature by for example exposing the decoked catalyst mass to the atmosphere for sufficient duration to achieve the desired water loading. At this point, the mass is stored in a sealed atmosphere, e.g., container, for sufficient duration to realize substantially uniform distribution of water by natural convection. A third suitable method is simultaneous partial rehydration and equilibration by contacting with gas containing sufficient water for adsorption to establish equilibrium at a selected temperature between the gas and crystalline zeolite such that the latter's concentration is in the desired 4–18 weight percent water range.

Following the partial rehydration and equilibration, the dual-function catalyst composition is preferably slowly reheated to temperatue of at least 850° F. but below the zeolite's crystal destruction temperaure; i.e., about 1500° F. for most species and in a nonoxidizing atmosphere. As used herein, "slow heating" means rates less than about 75° C. per hour. If heating is too fast, the molecular sieve's crystallinity, catalytic activity and isomerization selectivity may be reduced. Accordingly, "slow heating" also means rates below which these desired characteristics are impaired. This final reheating step is preferably conducted in a hydrogen atmosphere to insure reduction of the catalytically active metal to its most active, i.e., elemental, state. Alternatively, the reheating may be initiated in an inert atmosphere, e.g., nitrogen or argon, and may be completed with hydrogen. Still another alternative is to conduct the reheating in an inert atmosphere and later when ready to employ the catalyst in an organic reaction process to conduct a hydrogen treatment at an elevated temperature at least as high as that to be employed in the organic reaction to ensure that the active metal is in its active state.

The invention will be more clearly understood by the ensuing examples.

In one series of tests, zeolite Y having a silica-to-alumina molar ratio of about 5.0 was prepared according to the teachings of U.S. Patent No. 3,130,007, exchanged with ammonium (for decationization) and didymium (for introduction of polyvalent cations), and loaded with elemental palladium in its inner adsorption region according to the teachings of the afore-referenced patents. The finished catalyst pellets contained 20% by wt. of an aluminosilicate clay as a binder and the crystalline zeolite component had 45% of its aluminum structural atoms associated with didymium (a mixture of rare earths from which cerium has been largely removed), and only 10% of its aluminum structural atoms associated with sodium cations so was 45% decationized. It also contained about 0.50 weight percent palladium.

This catalyst was contacted with normal pentane in a hydrogen atmosphere at temperature of 660–680° F. for isomerization of the hydrocarbon feed (sample 1). The hydrocarbon conversion was continued until the catalytic activity (after about 700 hours' operation) declined as evidenced by substantially reduced yields of isopentane (sample 2). Samples of the catalyst bed were removed and found to contain about 5 weight percent coke. Other samples were subjected to an oxidative burnoff according to the procedure outlined in U.S. Patent No. 3,069,362.

In this oxidative burnoff, the samples were first preheated to a temperature of 750–850° F. in a nitrogen gas purge to remove any volatile matter from the catalyst. Air was then admitted into the nitrogen purge to provide a regenerating gas with $O_2$ concentration of about 1 mole percent, and the coke was burned off. After the initial burning front had passed through the bed as monitored by thermocouples, the $O_2$ concentration as well as the preheat temperature was progressively raised so that the final traces of coke were burned off in air at about 1000–1050° F.

One portion of the decoked bed was reused to catalyze the isomerization of normal pentane without further treatment in accordance with prior art teachings, and its activity measured (sample 3).

Another portion of the decoked bed was partially rehydrated by exposure to ambient air for 20–25 minutes. It was then equilibrated by heating at 80° C. (176° F.) in a closed container for a period of about 16 hours. Subsequent measurement indicated that this portion contained 4.6 weight percent $H_2O$. After this partial rehydration and equilibration, the catalyst (sample 4) was reheated at a rate of about 75° F. per hour to 950° F. in a hydrogen atmosphere for reactivation and reused to catalyze the isomerization of normal pentane. Still another portion of the decoked bed was partially rehydrated by exposure to ambient air for a period of about 6 hours and equilibrated by heating in a closed container at 80° C. (176° F.) for about 16 hours, thereby increasing its water content from 2.5 weight percent to 18 weight percent. This portion (sample 5) was reactivated in the same manner as the other samples and tested for isomerization activity.

TABLE I.—ISOMERIZATION* ACTIVITY AND SELECTIVITY OF A CRYSTALLINE ZEOLITE CATALYST UNDER DIFFERENT REGENERATION CONDITIONS

| Sample No. | Catalyst condition | Mole percent $C_1$-$C_4$ in liq. prod. | Mole percent i-pentane in pentane fraction |
|---|---|---|---|
| 1 | Fresh | 6.1 | 62.5 |
| 2 | Coked (5.05 wt. percent C) | 5.7 | 52.9 |
| 3 | Decoked—2.5 wt. percent $H_2O$ | 9.1 | 50.0 |
| 4 | Decoked—partially rehydrated to 4.6 wt. percent $H_2O$. | 4.3 | 59.5 |
| 5 | Decoked—rehydrated to 18 wt. percent $H_2O$. | 4.1 | 56.5 |

*450 p.s.i.g., 680–700° F., and $H_2$/pentane molar ratio of 4:1.

The Table I results demonstrate that partial rehydration and equilibration following oxidative burnoff of coke restores at least most of the catalytic activity of a crystalline zeolite containing catalytically active metal. A higher portion of this catalytic activity was restored with 4.6% $H_2O$ than with 18% $H_2O$, possibly due to a small loss of crystallinity in the more highly rehydrated sample during the elevated temperature reactivation step. For this reason, the partial rehydration should not exceed 18 weight percent. On the other hand, the partially rehydrated catalyst should contain at least 4 weight percent $H_2O$ to recover most of the catalytic activity lost by coking. The Table II data reveals that the decoked catalyst sample 3 (without partial rehydration) actually had less isomerization activity than the coked catalyst sample 2, whereas the partially rehydrated sample 4 regained about 95% of the activity possessed by the fresh catalyst sample 1.

A preferred embodiment of this invention requires partially rehydrating and equilibrating the catalyst so as to contain between 4 and 10 weight percent water.

In another series of tests with the same catalyst composition having 4–5.5 weight percent coke as carbon, the catalyst (sample 6) was preheated to a base temperature of about 875° F. in a stream of nitrogen to crack any hydrocarbon residue. Next, the coke was burned off in a diluted air stream containing 5% $O_2$ and 95% $N_2$ with a maximum temperature of 1058° F. This relatively high oxygen concentration did not adversely affect the molecular sieve's crystallinity in the small-scale laboratory adsorbent bed, but the $O_2$ concentration of the regenerating gas is preferably maintained below about 1 mol percent in large-scale commercial equipment. A burning front was observed to progress through the bed, the temperature of which was monitored by five thermocouples equally spaced along the bed length. The decoked catalyst (sample 7) was divided into two portions, one of which was partially rehydrated and equilibrated to 6.3 weight percent $H_2O$ by exposure to ambient air for about 30 minutes. Anhydrous X-ray diffraction patterns of regenerated catalyst in both the nonrehydrated and partially rehydrated forms were essentially the same. The results of n-pentane isomerization activity tests for coked and regenerated catalysts are shown in Table II. The regenerated samples 7 and 8 were heated at a rate of 75° F. per hour to 950° F. in a hydrogen stream.

lytically active metal-containing, nonmetallic cation-containing crystalline zeolite molecular sieve composition is heated to above 350° C. (662° F.). During this heating step, the nonmetal cations are decomposed to form a decationized molecular sieve. The latter hot material is cooled, partially rehydrated and equilibrated so as to contain 3–10 weight percent $H_2O$. The partially rehydrated and equilibrated decationized molecular sieve composition is then slowly reheated to 300–700° C. (572–1292° F.) and for sufficient duration to reduce the water loading to below 2½ weight percent $H_2O$. The resulting partially rehydrated catalyst is then contacted with hydrocarbon feedstock under converting conditions, and possesses far greater catalytic stability than the same fresh catalyst material without the partial rehydration step. That is, the fresh catalyst does not lose its initial convertion activity on sustained contact with feedstock. This treatment, hereinafter termed partial "pre-rehydration" for distinguishment from the present invention (partial "post-rehydration"), does not significantly affect the catalytic activity of decoked catalyst. It is predicated on a different principle from this invention—each molecule of $H_2O$ in partial pre-rehydration may react with two oppositely charged alumina tetrahedra in the molecular sieve. Samples 1–8 (see Table I and II) were partially pre-rehydrated to contain 5.9 wt. percent $H_2O$.

A third series of tests were conducted which compare the performance of catalysts treated by this partial pre-rehydration method and by the present invention. The catalyst composition was the same as employed in the Table I and II tests and the n-pentane isomerization activity and stability were measured in the same manner. Samples 11 and 12 were oxidatively regenerated by first heating in a $N_2$ stream to 750–850° F. to crack any hydrocarbon residue, and then decoking in a stream containing 1% $O_2$ and 99% $N_2$. Sample 12 is identical with sample 4. In each instance, a 50 cc. charge of catalyst was

TABLE II

| Sample No. | Catalyst condition | Hours on stream | Temp., °F. | W.H.S.V.* | Mole percent in liq. product $C_1$–$C_4$ | $i$-$C_5/C_5$ |
|---|---|---|---|---|---|---|
| 6 | Coked (4–5.5 wt. percent C) | 26.0 | 710 | 2.0 | 5.5 | 35.8 |
|   |   | 75.5 | 718 | 4.0 | 4.8 | 23.0 |
| 7 | Decoked (2.5 wt. percent $H_2O$) | 23.0 | 705 | 2.0 | 5.2 | 31.0 |
|   |   | 31.0 | 724 | 4.0 | 4.5 | 23.0 |
| 8 | Decoked–partially rehydrated (6.3 wt. percent $H_2O$) | 25.5 | 710 | 2.0 | 4.3 | 60.3 |
|   |   | 101.5 | 737 | 4.0 | 4.6 | 58.4 |

*Weight Hourly Space Velocity (lbs. feed per lbs. catalyst per hour).

This data shows essentially no difference between the isomerization activity of coked and decoked catalysts (samples 6 and 7). Thus, an ordinary oxidative burnoff did not restore the isomerization activity of the fresh catalyst. However, the catalyst sample 8 subjected to partial rehydration and equilibration after oxidative burnoff shows essentially complete recovery of n-pentane isomerization activity (compare with catalyst sample 1).

In copending application Ser. No. 528,816, filed Feb. 21, 1966, in the names of J. A. Rabo et al., now U.S. Patent 3,367,885, a method is described for preparing an improved hydrocarbon conversion catalyst in which a cataplaced in a test reactor and reduced in a hydrogen stream at a maximum temperature of 500° C. (932° F.), followed by introduction of n-pentane feed and hydrogen gas. The results of these tests are summarized in Table III.

TABLE III.—EFFECT OF PARTIAL REHYDRATION UPON THE n-PENTANE ISOMERIZATION ACTIVITY OF FRESH AND DECOKED ZEOLITE CATALYSTS

| Sample No. | Catalyst condition | Hours on stream | Avg. temp., °F. | Mole percent $C_1$–$C_4$ in liq. product | Mole percent $i$-$C_5$ in $C_5$ fraction |
|---|---|---|---|---|---|
| 9 | Fresh; no rehydration | 3.0 | 672 | 4.2 | 61.8 |
|   |   | 5.0 | 672 | 4.1 | 61.0 |
|   |   | 10.0 | 666 | 4.0 | 58.7 |
|   |   | 22.0 | 671 | 3.9 | 52.7 |
| 10 | Fresh; partially pre-rehydrated to 5.9 wt. percent $H_2O$ | 3.0 | 675 | 2.4 | 61.8 |
|   |   | 6.0 | 680 | 5.0 | 62.6 |
|   |   | 25.5 | 680 | 6.1 | 62.5 |
|   |   | 122.5 | 668 | 5.0 | 61.0 |
|   |   | 282.5 | 676 | 3.8 | 61.0 |
| 11 | Decoked; only pre-rehydrated to 5.9 wt. percent $H_2O$ | 2.0 | 679 | 0.8 | 40.2 |
|   |   | 7.0 | 745 | 13.0 | 53.7 |
|   |   | 23.5 | 734 | 9.1 | 50.0 |
| 12 | Decoked; pre-rehydrated to 5.9 wt. percent $H_2O$ and post-rehydrated to 4.6 wt. percent $H_2O$ | 3.5 | 686 | 2.3 | 55.2 |
|   |   | 25.5 | 708 | 4.3 | 59.5 |

A comparison of samples 9 and 11 shows that neither catalyst was completely satisfactory for isomerization of n-pentane over a long period. The fresh sample 9 initially provided high activity producing about 62 mol percent isopentane in the $C_5$ fraction at a cracking level of about 4 mol percent $C_1$–$C_4$. However, after 22 hours on-stream, the isopentane content of the $C_5$ fraction decreased to about 53 mol percent. Sample 10 provided high conversion to isopentane for the entire run, demonstrating the effectiveness of the partial prerehydration method described and claimed in the afore-referenced Rabo et al. application. Unfortunately, when the sample 10 type catalyst became coked so as to contain about 5 wt. percent C, placed on-stream as sample 15, and Table IV shows that it substantially completely regained the isomerization activity of the fresh catalyst sample 13. It is apparent that this remarkable improvement was due solely to the partial post-rehydration step.

TABLE IV.—EFFECT OF PARTIAL POST-REHYDRATION ON DECOKED ZEOLITE CATALYST ACTIVITY WITHOUT PRE-REHYDRATION

| Sample No. | Catalyst condition | Hours on stream | Arc. temp., °F. | Mol percent $C_1$–$C_4$ in liq. product | Mol percent i-$C_5$ in $C_5$ fraction |
|---|---|---|---|---|---|
| 13 | Fresh; no rehydration | 6.5<br>3.0 | 657<br>693 | 5.2<br>3.4 | 61.9<br>57.0 |
| 14 | Decoked (after third burn-off); no rehydration | 6.0<br>30.0 | 687<br>688 | 4.3<br>5.8 | 49.3<br>44.2 |
| 15 | Decoked (after third burn-off); post-rehydrated to 5.0 wt. percent $H_2O$ (no pre-rehydration) | 6.5<br>26.0<br>51.0<br>126.0 | 706<br>712<br>710<br>711 | 4.1<br>5.5<br>5.9<br>6.6 | 60.3<br>59.7<br>61.0<br>60.5 | oxidative burnoff by itself did not restore its original activity. Instead, sample 11 showed poor activity even initially, producing about 54 mol percent isopentane in the $C_5$ fraction at an excessively high cracking level of about 13 mol percent $C_1$–$C_4$.

Sample 12 was similar to sample 11 except that it was treated according to the present invention, by partial rehydration and equilibration after oxidative burnoff of coke so as to contain 4.6% $H_2O$. This treatment restored the catalyst's isomerization activity to nearly the original level of the fresh catalyst sample 9 and the sustained level of fresh, partially pre-rehydrated sample 10. It should be understood from the Table III data that each type of patrial rehydration provides a different advantageous modification of crystalline zeolite catalyst characteristics. In the case of fresh catalyst sample 9 which demonstrated high initial activity but poor stability, the partial pre-rehydration resulted in stabilization of the catalyst activity (see sample 10). In the case of oxidatively regenerated catalyst even with partial pre-rehydration, the isomerization activity has been suppressed (see sample 11) and the partial post-rehydration brings about a recovery of catalytic activity. Accordingly, the two types of partial rehydration are entirely different phenomenon, and in a preferred embodiment of this invention both forms are employed.

A fourth series of tests were conducted demonstrating that the catalyst activity recovery achieved by partial post-rehydration is not dependent on previous partial pre-rehydration of the catalyst before use. This catalyst composition was the same as employed in the Table I–III tests, and the n-pentane isomerization activity and stability measured in the same manner. The fresh catalyst sample 13 was not partially pre-rehydrated as was fresh sample 10 of Table III. This sample was kept on-stream for over 75 hours with good activity at 450 p.s.i.g., bed temperature of about 660° F. and $H_2$/pentane molar ratio of 4:1. After two consecutive cycles of oxidative burnoff and on-stream, the coke was oxidatively burned off from the catalyst for the third time and a portion of the decoked material placed on-stream again as sample 14 without partial post-rehydration. It will be apparent from the following Table IV that the catalyst had lost a considerable part of its isomerization activity, i.e., from 61.9 to 44.2 mol percent iso-pentane after 30 hours or 28.4% of the original activity.

Another portion of thrice-decoked catalyst was partially post-rehydrated to 5.0 wt. percent $H_2O$, equilibrated and reheated to 500° C. (932° F.) in a hydrogen atmosphere for reactivation. The resulting catalyst was again placed on-stream as sample 15, and Table IV shows that it substantially completely regained the isomerization activity of the fresh catalyst sample 13. It is apparent that this remarkable improvement was due solely to the partial post-rehydration step.

Although certain embodiments have been described in detail, it will be appreciated that other embodiments are contemplated along with modifications of the disclosed features, as being within the scope of the invention.

What is claimed is:

1. In the oxidative regeneration of a coked crystalline zeolitic catalyst composition containing catalytically active metal, the improvement comprising the steps of providing the decoked catalyst composition from the oxidative burnoff at temperature of at least 800° F.; cooling the catalyst to below 600° F. and partially rehydrating and equilibrating the catalyst so as to contain between 4 and 18 weight percent water in the crystalline zeolite; and reheating the cooled, partially rehydrated and equilibrated catalyst to temperature of at least 850° F. in a nonoxidizing atmosphere for reactivation.

2. An oxidative regeneration method according to claim 1 in which the partially rehydrated and equilibrated catalyst contains between 4 and 10 weight percent water.

3. An oxidative regeneration method according to claim 1 in which the cooled, partially rehydrated and equilibrated catalyst is reheated at a rate of less than 75° F. per hour.

4. An oxidative regeneration method according to claim 1 in which the catalyst composition is decationized zeolite Y having less than 60 percent of its aluminum structural atoms associated with cations, and contains catalytically active metal in its inner adsorption region.

5. An oxidative regeneration method according to claim 1 in which the catalyst composition is partially decationized zeolite Y having at least 10 percent of its aluminum structural atoms associated with polyvalent cations, and contains catalytically active metal in its inner adsorption region.

6. An oxidative regeneration method according to claim 1 in which said nonoxidizing atmosphere is hydrogen.

7. A method for regenerating a coked crystalline zeolite catalyst composition containing catalytically active metal, comprising the steps of:
(a) providing such coked catalyst and contacting same with an oxygen-containing gas at temperature of at least 800° F. and sufficient to burn the coke;
(b) cooling the decoked catalyst to below 600° F. and partially rehydrating and equilibrating such catalyst so as to contain between 4 and 18 weight percent water in the crystalline zeolite; and
(c) reheating the cooled, partially rehydrated and equilibrated catalyst to temperature of at least 850° F. in a hydrogen atmosphere for reactivation.

(References on following page)

References Cited

UNITED STATES PATENTS

| | | | |
|---|---|---|---|
| 3,013,980 | 12/1961 | Carr et al. | 252—416 |
| 3,243,384 | 3/1966 | Raarup | 252—416 X |
| 3,288,719 | 11/1966 | Asher et al. | 252—416 |
| 3,375,204 | 3/1968 | Hoke | 252—455 X |

DANIEL E. WYMAN, *Primary Examiner.*

C. F. DEES, *Assistant Examiner.*

U.S. Cl. X.R.

252—420, 455